UNITED STATES PATENT OFFICE.

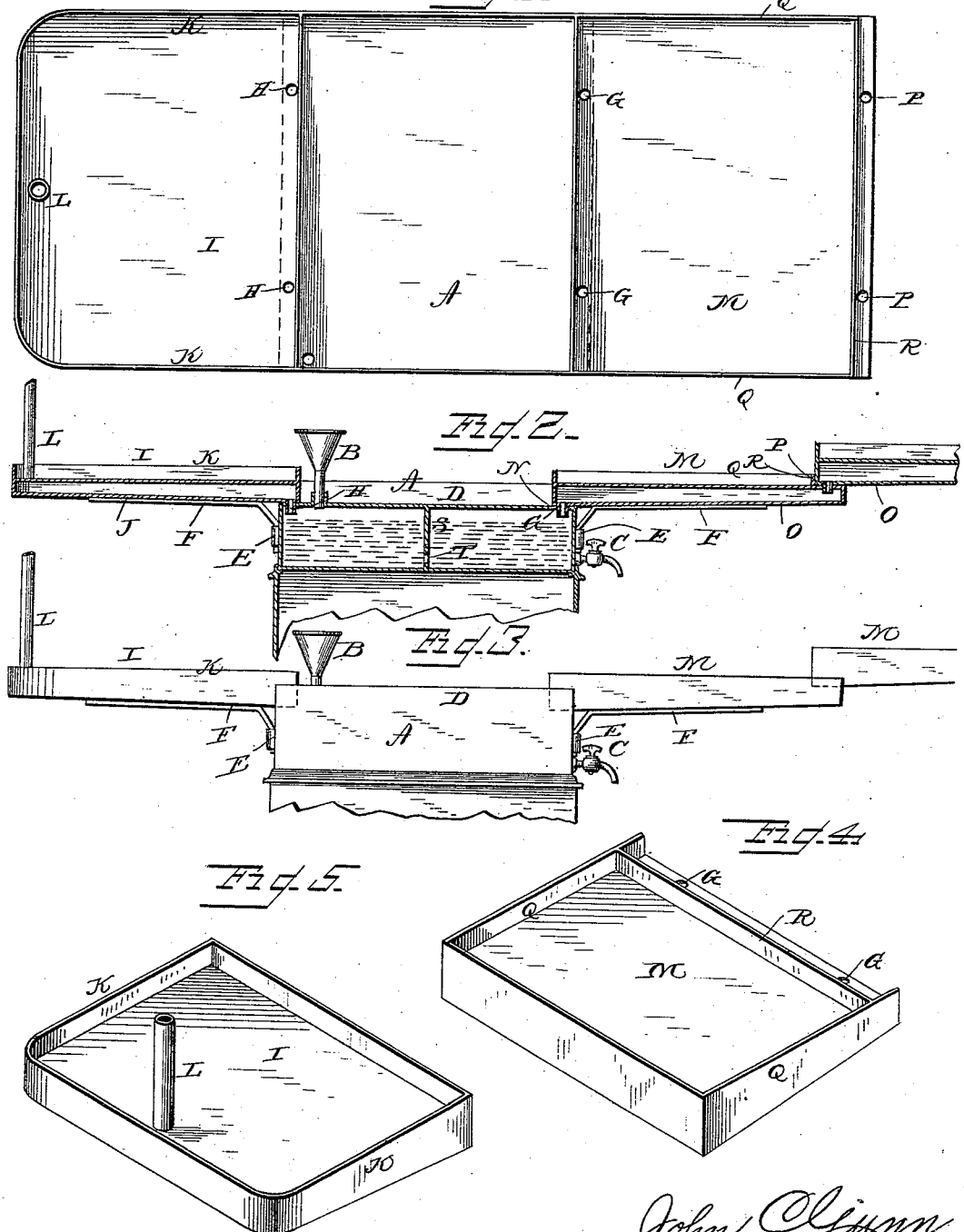

JOHN C. GUNN, OF KNOXVILLE, TENN., ASSIGNOR OF TWO-THIRDS TO JAMES L. PHELPS AND LEWIS C. DRAKE, BOTH OF NICHOLASVILLE, KY.

FRUIT AND VEGETABLE DRIER.

SPECIFICATION forming part of Letters Patent No. 307,854, dated November 11, 1884.

Application filed April 14, 1883. Renewed May 28, 1884. (No model.)

*To all whom it may concern:*

Be it known that I, JOHN C. GUNN, a citizen of the United States, residing at Knoxville, in the county of Knox and State of Tennessee, have invented a new and useful Fruit and Vegetable Drier, of which the following is a specification, reference being had to the accompanying drawings.

This invention relates to fruit and vegetable driers; and it consists in certain improvements in the construction of the same, the object of which is to produce a device which shall be simple, inexpensive, portable, and capable of being successfully used in connection with any ordinary cooking stove or range, as will be hereinafter fully described, and particularly pointed out in the claims.

In the drawings hereto annexed, Figure 1 is a plan view of my improved fruit and vegetable drier. Fig. 2 is a longitudinal vertical sectional view of the same. Fig. 3 is a side view. Fig. 4 is a perspective view of one of the extension-pans detached, and Fig. 5 is a perspective view of one of the end pans detached.

The same letters refer to the same parts in all the figures.

A in the drawings represents a steam-generator, which consists of a suitable flat rectangular vessel having a filling-funnel, B, a draw-off cock, C, and provided with flanges D D, extending upwardly from its sides, as shown. The ends of the vessel A are provided with loops E E, in which supporting-brackets F are detachably hinged or pivoted. The upper side of the vessel A is provided at or near both ends with openings G G, to receive tubes or spouts H H, extending downwardly from the end pans, I, which are arranged to be supported upon the brackets F. The said end pans consist of closed vessels, the bottoms of which, J, slant downwardly to the spouts H. The sides and ends of the pans have upwardly-projecting flanges K, and the outer ends of the pans have upwardly-extending tubes L, for the escape of steam.

M M are extension-pans, consisting of closed pans or flat vessels provided at one end with downwardly-projecting spouts N, adapted to enter the openings G in the generator A. The bottoms O of said extension-pans slant downwardly to the spouts N, and the upper sides of the pans are provided at their outer ends with openings P, to receive the spouts of additional extension-pans or those of the end pans, as the case may be. The sides and the inner end of the extension-pans are provided with upwardly-projecting flanges Q. An additional flange, R, may be arranged near the outer end in such a manner, however, as not to interfere with the openings P.

The generating-vessel A is provided with a centrally-located partition, S, having perforations T at its lower end. Said partition serves to divide the steam-space of the generator into two sections, while the water-spaces communicate through the openings or perforations T.

The operation and advantages of my invention will be readily understood from the foregoing description, taken in connection with the drawings hereto annexed. The generator A is to be placed upon a stove, range, or other suitable heater and filled with water. The end pans are then to be placed in position; or, if desired, in order to increase the capacity of the device, any desired number of the extension-pans may be interposed between the generator and the end pans. If this is done, suitable supporting-brackets are to be provided for the said extension and end pans, in addition to the hinged brackets F. When the water in the generator is converted into steam, the latter passes from the compartments of the generator through the several pans, which are thus heated, and out through the tubes L. Owing to the inclined bottoms of the extension and end pans, the water of condensation will pass back into the generator. The fruit and vegetables to be dried are placed on top of the generator and pans. These, being flanged, admit of various kinds of fruits and vegetables being dried at the same time without danger of getting mixed. There being no covers or upper shelves, the contents of the several pans are accessible without danger of burning the hands. When not in use, the device may be taken apart and packed or stored in small space.

I claim as my invention and desire to secure by Letters Patent of the United States—

1. The combination, with a steam-generating vessel, of drying-trays arranged above and resting upon the edges of the said generating-vessel so as to extend outwardly from the ends of the same, and connected therewith by suitable pipes or spouts, as set forth.

2. The combination of the generating-vessel having openings in its upper side near its ends, supporting-brackets hinged detachably to the ends of the said vessel, and drying-trays supported upon the said brackets in the position shown—that is, above and extending outward from the ends of the generating-vessel—said drying-trays having slanting bottoms, provided at their inner lower ends with downwardly-projecting spouts communicating with the generating-vessel, as set forth.

3. The combination, with the steam-generating vessel, of the hollow detachable drying pans or trays supported above and at the sides of the said generating-vessel, connected with the same by suitable tubes or spouts, and having upwardly-projecting flanges, as set forth.

4. The combination of the steam-generating vessel having openings at its outer ends in its upper side, the end pans having downwardly-projecting spouts at their inner ends and upwardly-projecting steam-escape tubes at their outer ends, and intermediate extension-pans having downwardly-projecting spouts at their inner ends and openings in their upper sides at or near their outer ends, to receive the spouts of the end pans or of additional extension-pans, as set forth.

5. As an improvement in fruit and vegetable driers, the combination of a generating-vessel having a transverse partition with perforations at its lower end, and provided with openings in its upper side near its outer ends, supporting-brackets hinged detachably to the ends of said generator, the extension-pans and end pans, suitable steam-passages and escape-tubes, and means for filling and emptying the generating-vessel, as set forth.

In testimony that I claim the foregoing as my own I have hereto affixed my signature in presence of two witnesses.

JOHN C. GUNN.

Witnesses:
SAM MCKINNEY,
M. R. MITCHELL.